United States Patent
Bernard et al.

(10) Patent No.: US 12,139,253 B1
(45) Date of Patent: Nov. 12, 2024

(54) TILTROTOR AIRCRAFT CONTROL SYSTEM

(71) Applicant: Textron Innovations Inc., Providence, RI (US)

(72) Inventors: Guy Bernard, Kirkland (CA); Steven G. Hagerott, Wichita, KS (US)

(73) Assignee: Textron eAviation Inc., Providence, RI (US)

( * ) Notice: Subject to any disclaimer, the term of this patent is extended or adjusted under 35 U.S.C. 154(b) by 0 days.

(21) Appl. No.: 18/463,167

(22) Filed: Sep. 7, 2023

(51) Int. Cl.
  *B64C 29/00* (2006.01)
  *B64C 13/50* (2006.01)
  *B64D 27/24* (2006.01)

(52) U.S. Cl.
  CPC ........ *B64C 29/0033* (2013.01); *B64C 13/503* (2013.01); *B64D 27/24* (2013.01)

(58) Field of Classification Search
  CPC .... B64C 29/0033; B64C 13/503; B64D 27/24
  See application file for complete search history.

(56) References Cited

U.S. PATENT DOCUMENTS

| | | | | |
|---|---|---|---|---|
| 10,983,534 | B2 * | 4/2021 | English | G05D 1/102 |
| 11,235,860 | B2 | 2/2022 | Shue | |
| 11,667,375 | B2 * | 6/2023 | De Freitas | B64C 29/0033 |
| | | | | 244/12.4 |
| 11,702,191 | B1 * | 7/2023 | Depenbusch | B64C 13/0421 |
| | | | | 701/3 |
| 12,049,307 | B2 * | 7/2024 | Stobbe | B64C 3/32 |
| 2022/0135210 | A1 | 5/2022 | Fedely et al. | |

OTHER PUBLICATIONS

Denham, JR., James W. and Paines, Justin, "Converging on a Precision Hover Control Strategy for the F-35B STOVL Aircraft," Aug. 18-21, 2008, 14 Pages, American Institute of Aeronautics and Astronautics, AIAA Guidance, Navigation and Control Conference and Exhibit, AIAA 2008-6331.

Dollinger, Daniel, et al., "Control Inceptor Design for Onboard Piloted Transition VTOL Aircraft Considering Simplified Vehicle Operation," Jan. 11-15 & 19-21, 2021, 11 Pages, Virtual Event, AIAA Scitech 2021 Forum, 10.2514/6.2021-1896.

* cited by examiner

*Primary Examiner* — Brian M O'Hara
(74) *Attorney, Agent, or Firm* — Fogarty LLP

(57) ABSTRACT

Embodiments are directed to systems and methods for controlling a tiltrotor aircraft using a flight control system. A flight control computer is configured to control aircraft effectors in response to inputs from inceptors. The flight control computer stores instructions for controlling aircraft effectors. The instructions cause the flight control computer to perform the steps of converting a signal representing longitudinal motion of a first inceptor into a fore-and-aft translational rate command for the tiltrotor aircraft; converting a signal representing lateral motion of the first inceptor into a side-to-side translational rate command for the tiltrotor aircraft; converting a signal representing longitudinal motion of a second inceptor into a height rate command for the tiltrotor aircraft; and converting a signal representing lateral motion of the second inceptor to a yaw rate command for the tiltrotor aircraft.

15 Claims, 10 Drawing Sheets

TILTROTOR AIRCRAFT CONTROL SYSTEM

BACKGROUND

An electric vertical takeoff and landing (eVTOL) is a type of aircraft that uses electric power to supply rotational energy through electric motor(s) to props, rotors, or fans in an aircraft propulsion system for enabling the aircraft to hover, take off, and land vertically. Because of their versatility and lack of a need for a runway, eVTOLs are particularly useful for providing urban air mobility. As used herein, the term eVTOL also includes VTOLs that use hybrid electric (with an engine running a generator producing electricity and battery stored power) or turbo electric (an engine running a generator providing all power required) propulsion systems.

Aircraft are typically controlled by moveable aerodynamic surfaces on the wings and tail for controlling the altitude and attitude of the aircraft in flight, including roll, pitch, and yaw. eVTOL aircraft may use power-assisted or fully powered control systems to transmit an operator's control inputs to these surfaces. Most powered control systems use mechanical linkages to command the surface actuators, but "fly-by-wire" control systems are becoming more common. In these systems, the mechanical linkage is replaced by a computerized command and feedback loop.

SUMMARY

Embodiments are directed to systems and methods for controlling an aircraft using a flight control system. A flight control computer is configured to control aircraft effectors in response to inputs from inceptors. The flight control computer stores instructions for controlling aircraft effectors. The instructions cause the flight control computer to perform the steps of converting a signal representing longitudinal motion of a first inceptor into a fore-and-aft translational rate command for the aircraft; converting a signal representing lateral motion of the first inceptor into a side-to-side translational rate command for the aircraft; converting a signal representing longitudinal motion of a second inceptor into a height rate command for the aircraft; and converting a signal representing lateral motion of the second inceptor to a yaw rate command for the aircraft. Hard stops may be adapted to prevent lateral movement of the first inceptor beyond a threshold position. The threshold position may vary depending on an aircraft mode.

The flight control computer may further be configured to determine that the longitudinal motion of the first inceptor has exceeded a threshold position, and to convert the signal representing longitudinal motion of the first inceptor beyond the threshold position into an acceleration command for the aircraft. The threshold position may be determined by a soft stop in the first inceptor. The flight control computer may further be configured to determine whether the aircraft has exceeded a threshold velocity before converting the signal representing longitudinal motion of the first inceptor into an acceleration command.

When longitudinal motion of the first inceptor is held beyond the threshold position, the flight control computer may transition the aircraft propulsion systems from a hover mode to a cruise mode.

The flight control computer may further be configured to determine that the aircraft has transitioned out of a hover mode, and to convert the signal representing a longitudinal motion of the second inceptor into a flight path change rate command for the aircraft. When the second inceptor is released, the flight control computer may maintain an aircraft flight path angle.

The flight control computer may further be configured to determine that an airspeed of the aircraft is below a threshold speed and to control a position of the aircraft using a Translational Rate Control (TRC) mode. When the first inceptor is released, the flight control computer may decelerate the aircraft to zero speed and hold a constant ground position.

The first and second inceptors may be sidestick controls. The aircraft effectors may be one or more of a rotor cyclic control, a rotor/propellor collective control, an electric motor speed, torque, or current command, a control surface, a rotor, a propellor, or an actuator configured to control the position of the control surface, rotor, or propeller.

The flight control system may include a switch that is configured to command an automated transition to a minimum cruise speed when the aircraft is operating in a hover mode and to command an automated transition to a zero speed hover mode when the aircraft is operating in a cruise mode.

In one example, an aircraft comprises a fuselage, a cockpit within the fuselage, the cockpit including a first inceptor and a second inceptor, a wing connected to the fuselage, a first set of propulsion systems, a second set of propulsion systems, and a flight control system. The propulsion systems include a rotor assembly comprising a plurality of rotor blades. At least one of the first and second sets of propulsion systems are tiltable between a first position when the aircraft is in a hover mode and a second position when the aircraft is in a cruise mode. The flight control system is configured to control the first and second sets of propulsion systems in response to inputs from the first and second inceptors. The flight control computer is adapted to convert a signal representing longitudinal motion of the first inceptor into a fore-and-aft translational rate command for the aircraft; convert a signal representing lateral motion of the first inceptor into a side-to-side translational rate command for the aircraft; convert a signal representing longitudinal motion of the second inceptor into a height rate command for the aircraft; and convert a signal representing lateral motion of the second inceptor to a yaw rate command for the aircraft.

The aircraft may further comprise a third set of propulsion systems, wherein the flight control system is further configured to control the third set of propulsion systems in response to inputs from the first and second inceptors. The three sets of propulsion systems may collectively comprise a hexrotor configuration when the aircraft is in the hover mode.

The flight control computer may be further adapted to determine that the longitudinal motion of the first inceptor has exceeded a threshold position, and to convert the signal representing longitudinal motion of the first inceptor beyond the threshold position into an acceleration command for the aircraft, wherein the threshold position is determined by a soft stop in the first inceptor. The flight control computer may be further adapted to determine whether the aircraft has exceeded a threshold velocity before converting the signal representing longitudinal motion of the first inceptor into an acceleration command. The flight control computer may be further adapted to transition the propulsion systems from a hover mode to a cruise mode when the longitudinal motion of the first inceptor is held beyond the threshold position.

The flight control computer may be further adapted to determine that the aircraft has transitioned out of a hover mode, and to convert the signal representing a longitudinal motion of the second inceptor into a flight path change rate command for the aircraft.

The flight control computer may be further adapted to determine that an airspeed of the aircraft is below a threshold speed and to control a position of the aircraft using a TRC mode.

BRIEF DESCRIPTION OF THE DRAWINGS

Figure 1A:
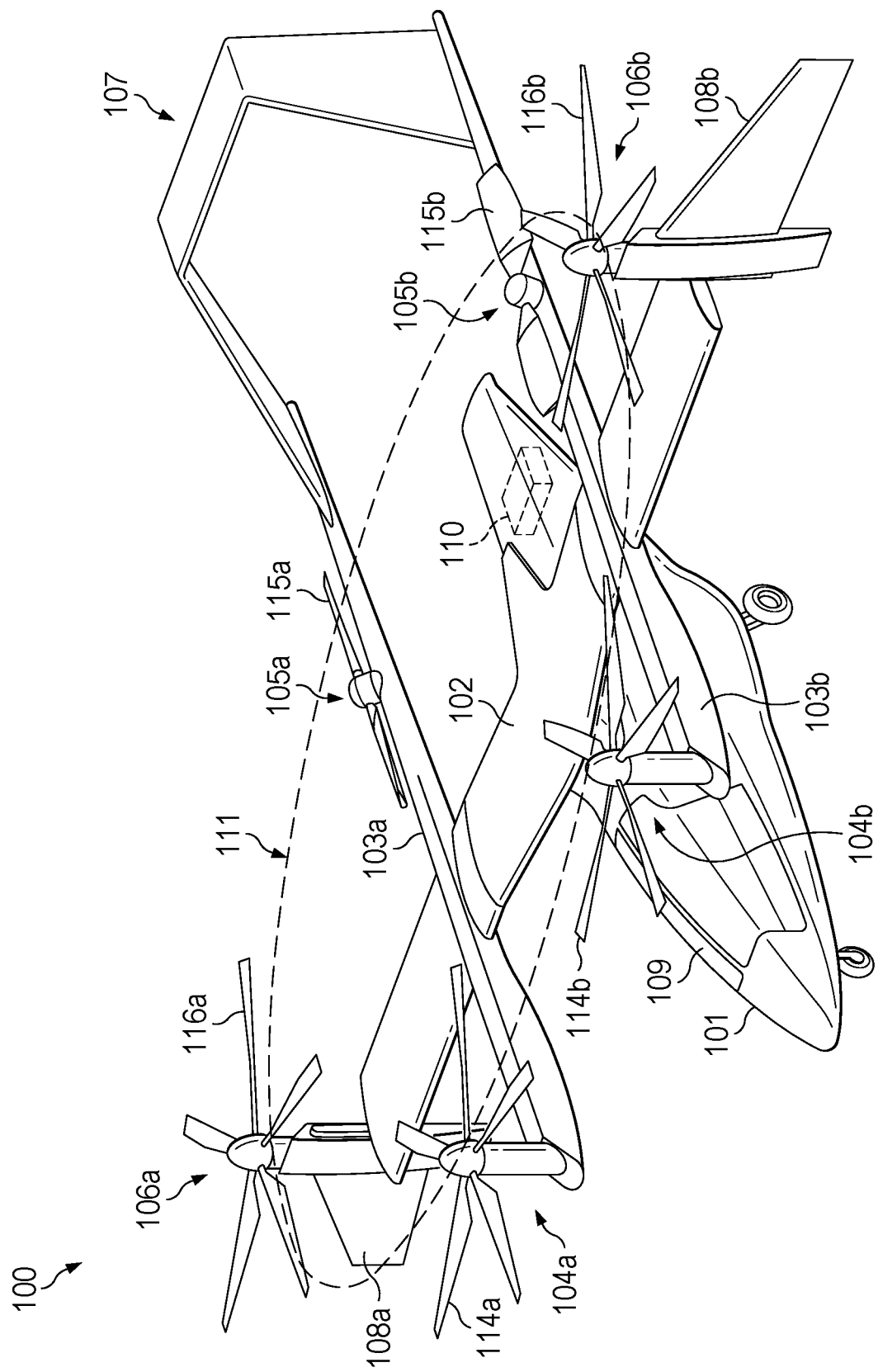
Figure 1B:
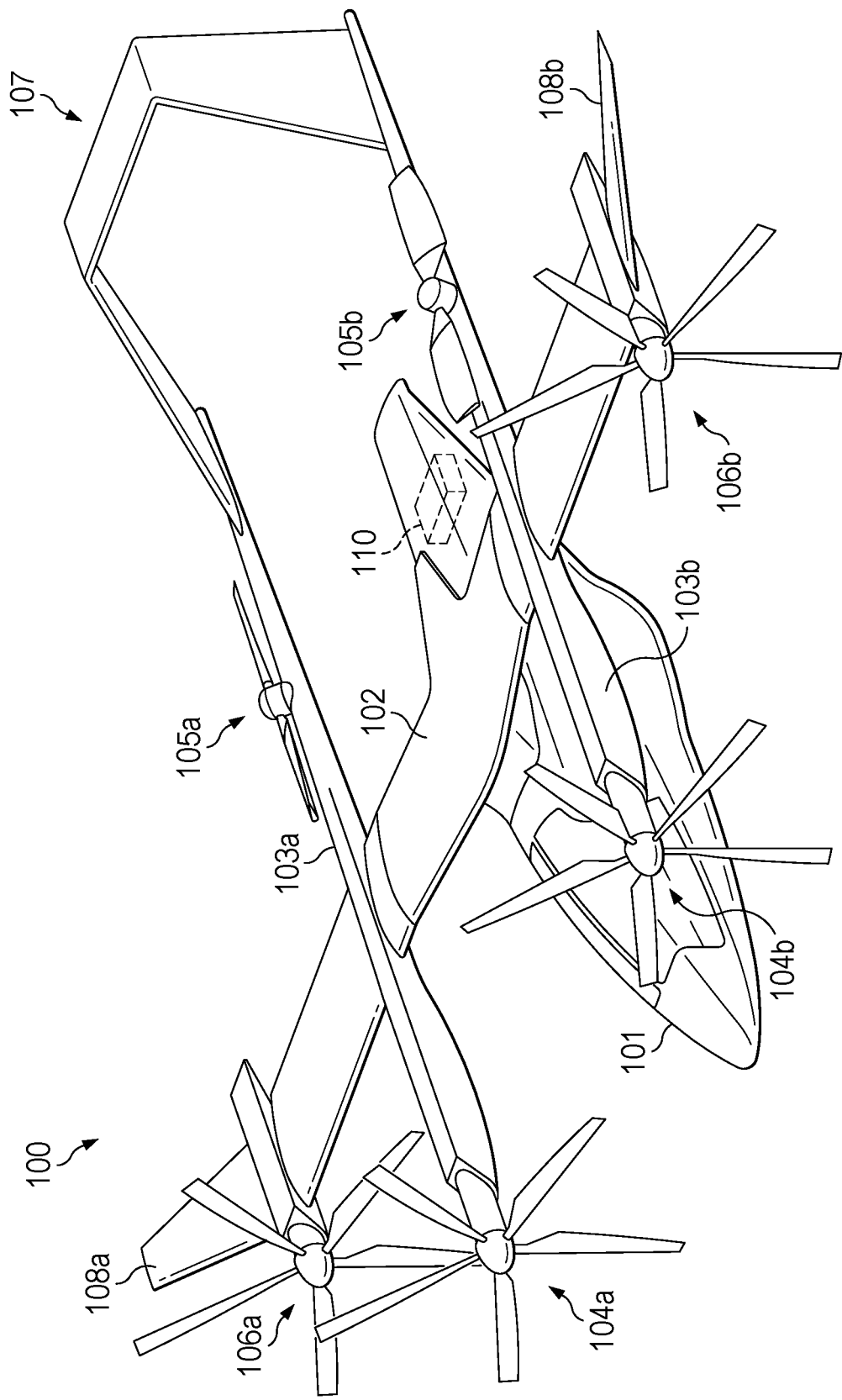

Having thus described the invention in general terms, reference will now be made to the accompanying drawings, which are not necessarily drawn to scale, and wherein:

FIGS. 1A and 1B illustrate an example tiltrotor aircraft that is convertible between a VTOL or hover mode and a cruise mode.

Figure 2A:
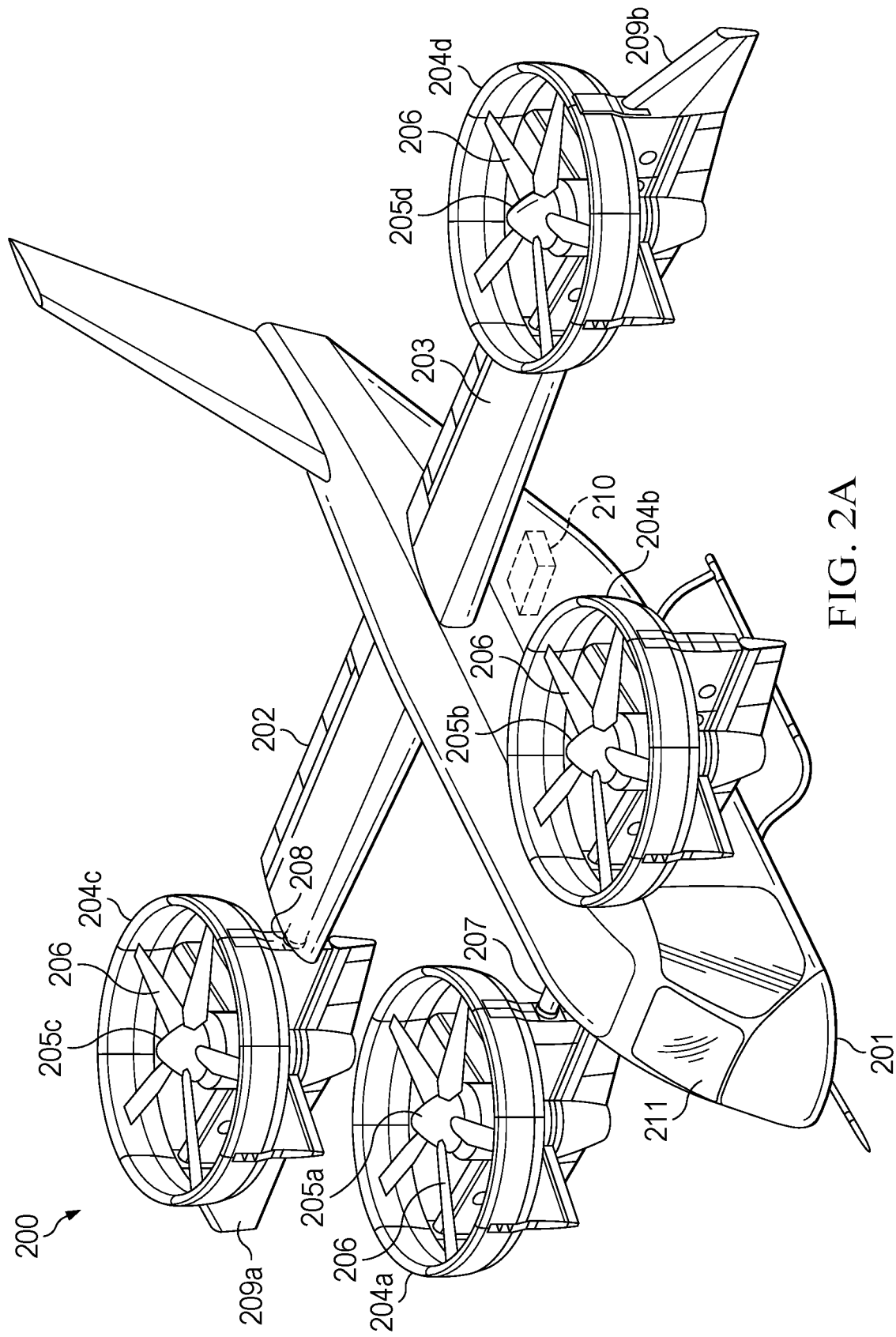
Figure 2B:
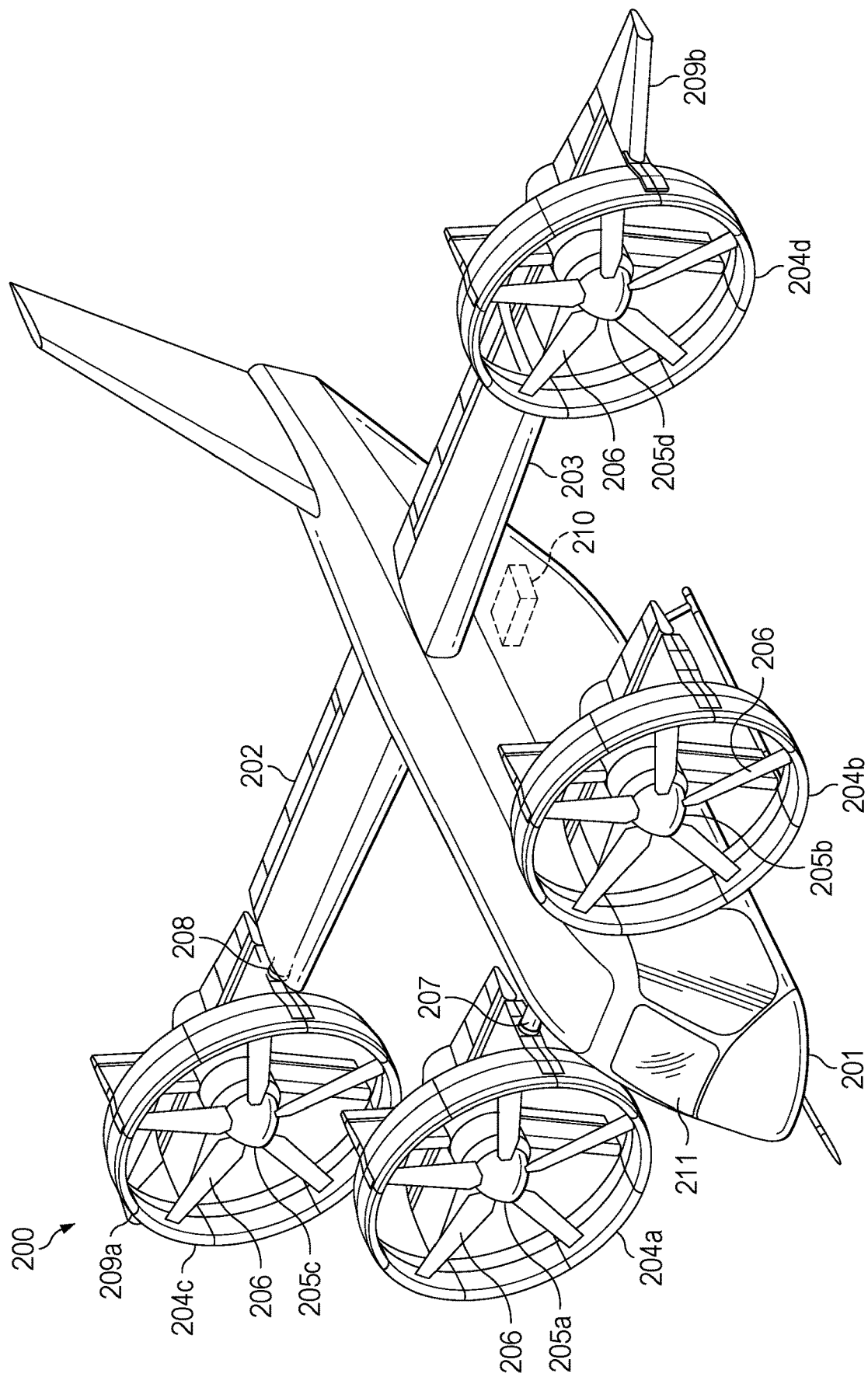

FIGS. 2A and 2B illustrate an example tiltrotor aircraft embodiment that includes ducted rotors or fans.

Figure 3:
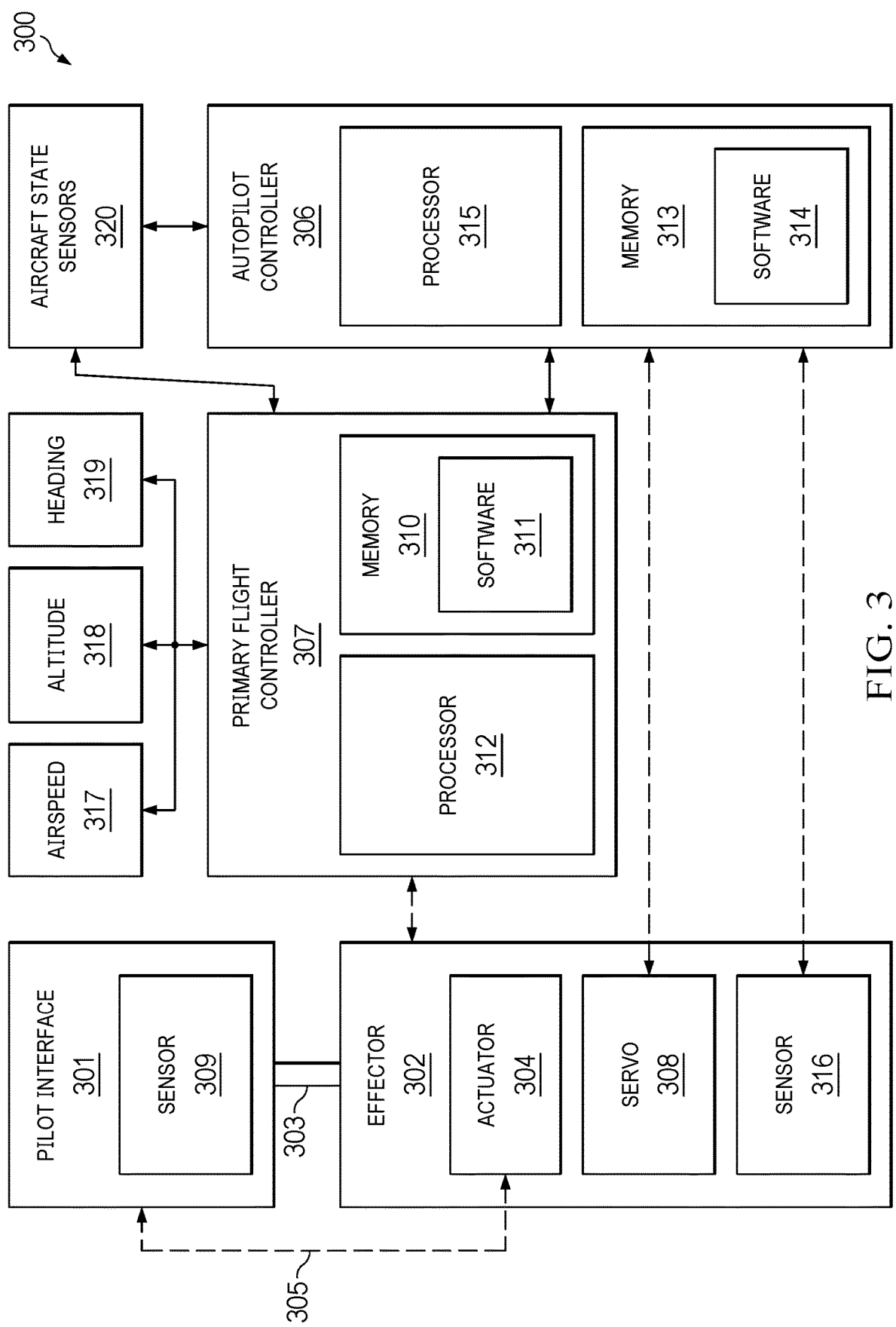

FIG. 3 is a block diagram showing an exemplary FBW system for an aircraft such as those illustrated in FIGS. 1A, 1B, 2A, and 2B.

Figure 4:
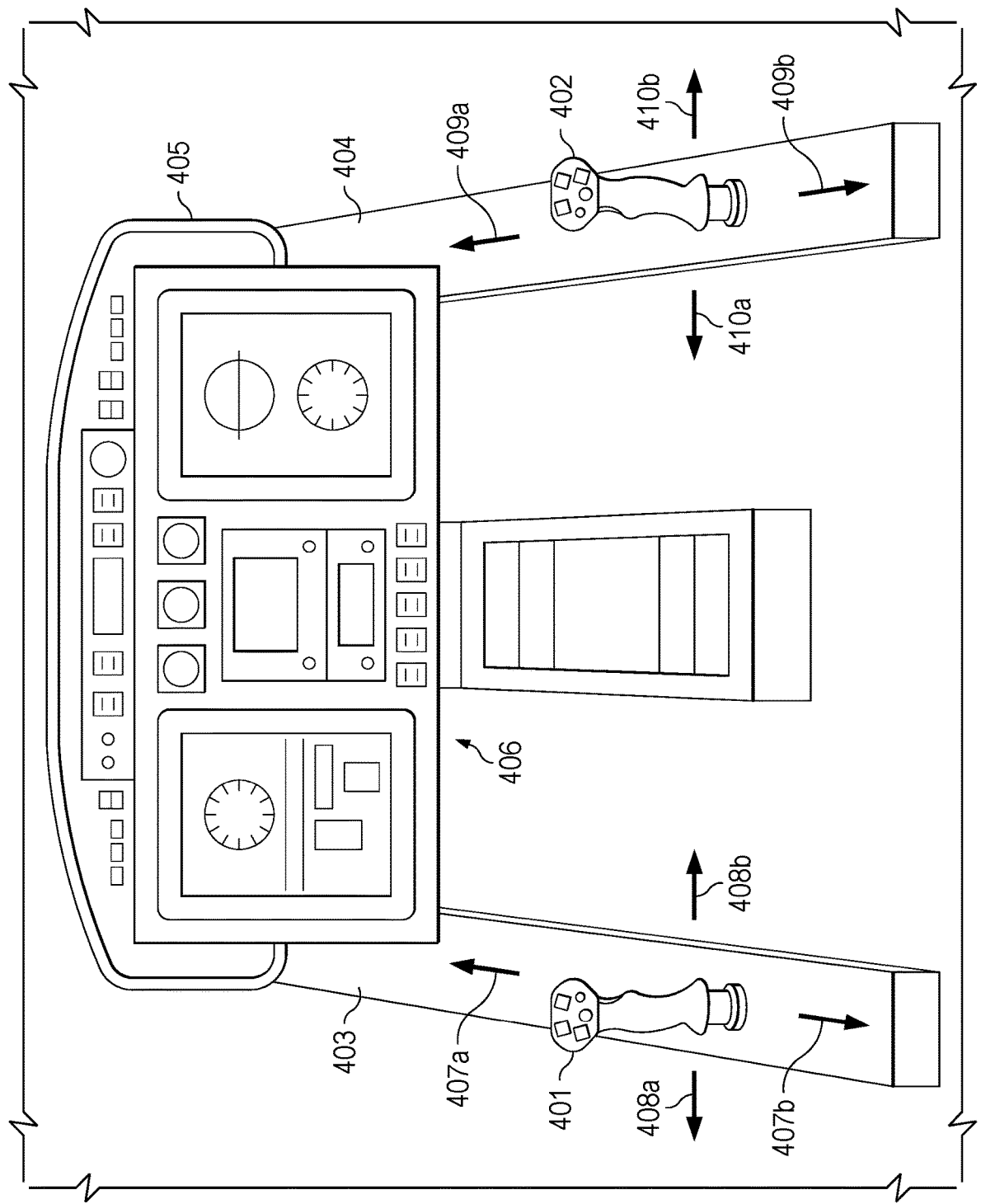

FIG. 4 illustrates an example embodiment of a flight control configuration for an aircraft such as those illustrated in FIGS. 1A, 1B, 2A, and 2B.

Figure 5:
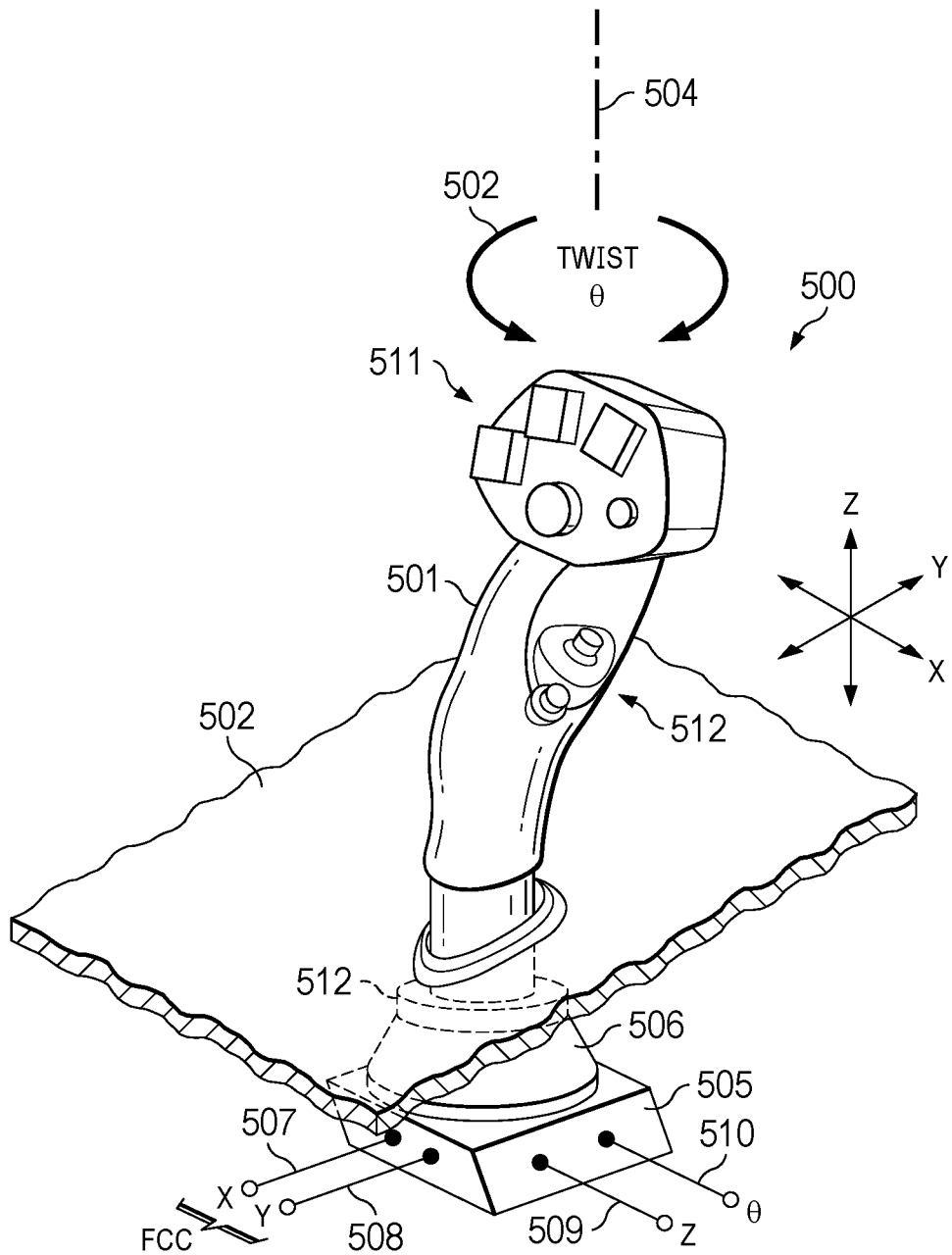

FIG. 5 is a perspective view of an illustrative example of an inceptor that may be used with embodiments disclosed herein.

Figure 6A:
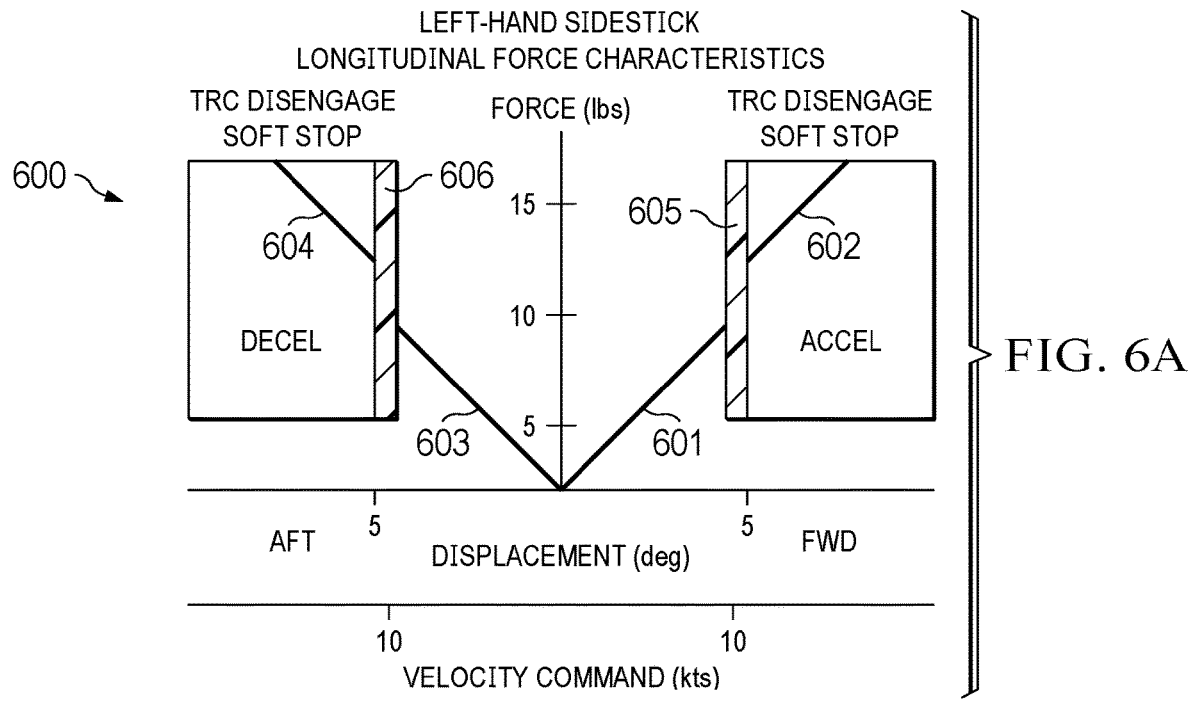
Figure 6B:
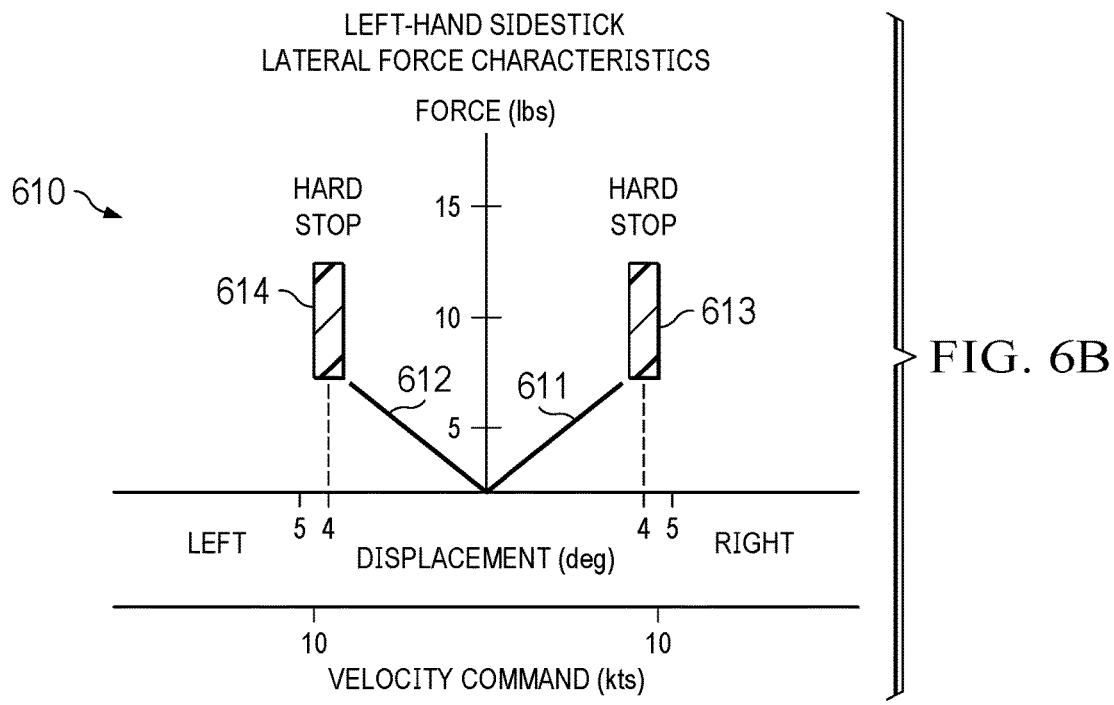

FIGS. 6A and 6B are graphs illustrating longitudinal and lateral force characteristics, respectively, for a left-hand sidestick in the example configuration.

Figure 7A:
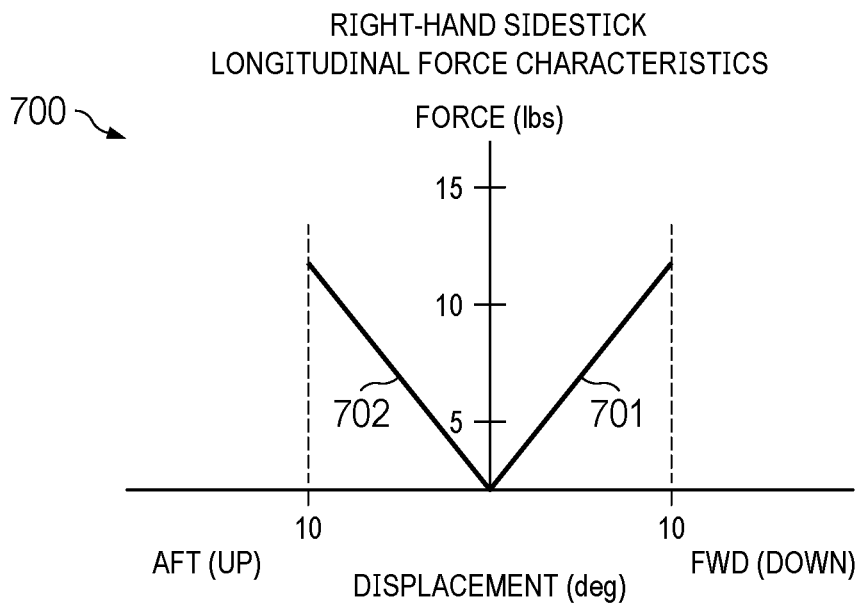
Figure 7B:
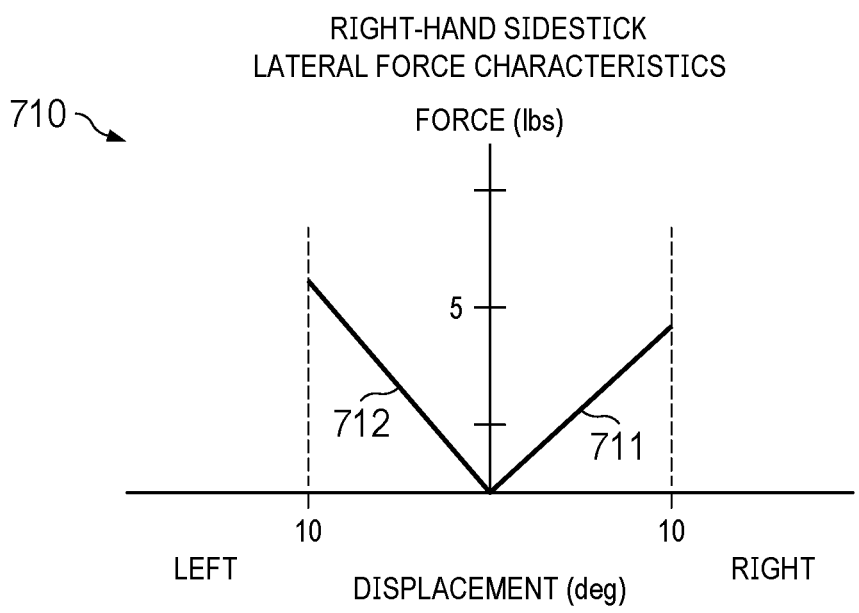

FIGS. 7A and 7B are graphs illustrating longitudinal and lateral force characteristics, respectively, for a right-hand sidestick in the example configuration.

Figure 8:
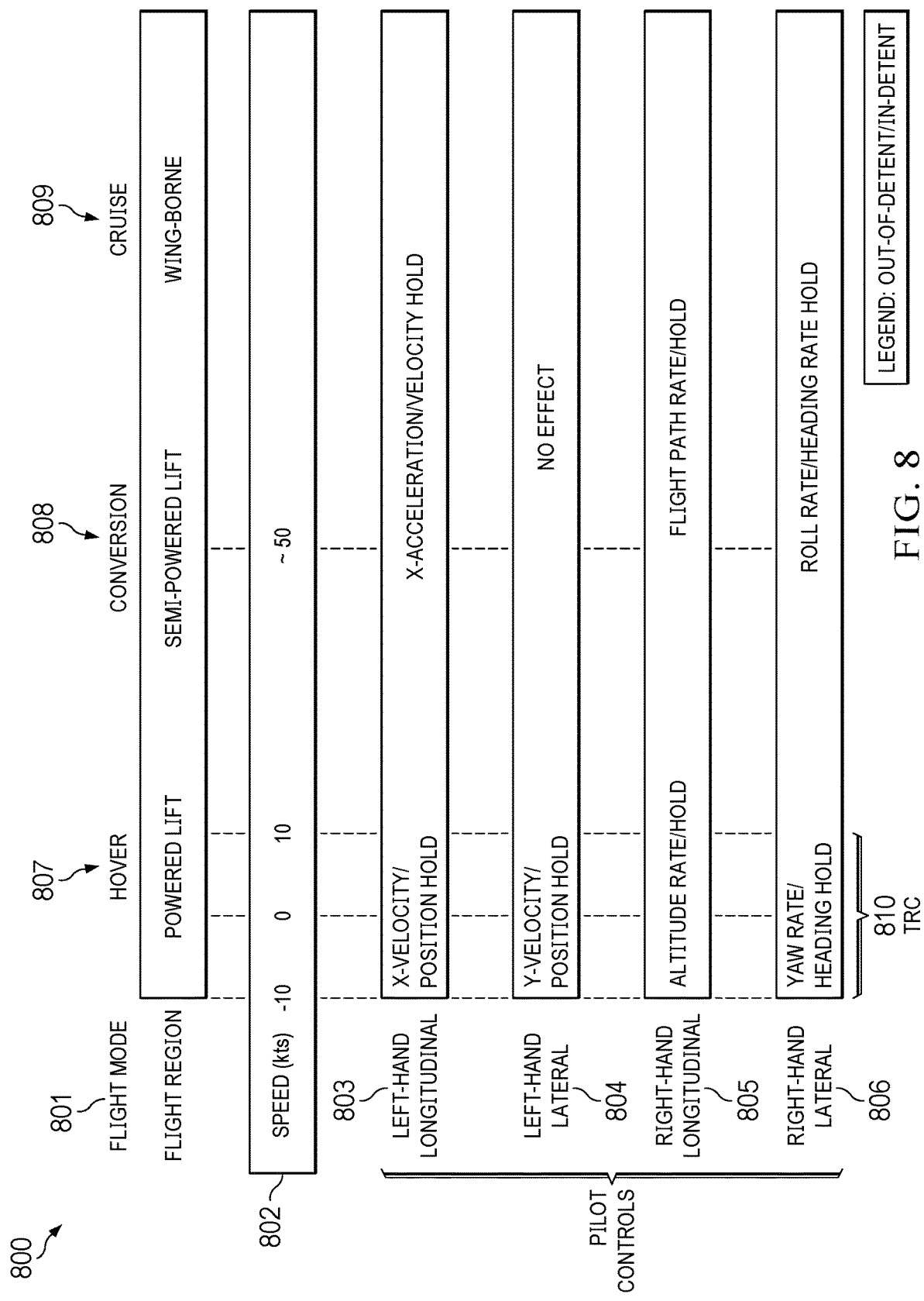

FIG. 8 is a chart illustrating flight control inputs using a dual inceptor system across different flight modes and airspeeds.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward," "aft," "inboard," and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying Figures.

Described herein are various configurations of example hexrotor and quadrotor aircraft; however, it will be understood that other aircraft configurations may use embodiments of the flight control systems disclosed herein.

FIGS. 1A and 1B illustrate an example tiltrotor aircraft 100 that is convertible between a VTOL or hover mode (also commonly referred to as helicopter mode), shown in FIG. 1A, that allows for vertical takeoff and landing, hovering, and low speed directional movement, and a cruise mode (also commonly referred to as airplane mode or wing-borne flight), shown in FIG. 1B, that allows for forward flight as well as horizontal takeoff and landing. The aircraft configuration between hover mode and cruise mode (i.e., when the propulsion system pylons are between the 90° hover position to the 0° cruise position) is commonly referred to as a conversion mode or conversion corridor. Aircraft 100 includes a fuselage 101, wing 102, and booms 103a, 103b connected to the wing 102 on opposite sides of the fuselage 101. In accordance with features of embodiments described herein, aircraft 100 further includes three pairs of propulsion systems, including a forward pair of boom-mounted propulsion systems 104a, 104b, an aft pair of boom-mounted propulsion systems 105a, 105b, and a pair of wing-mounted propulsion systems 106a, 106b. In the illustrated embodiment, propulsion systems 106a, 106b are tiltably connected to the wing 102 proximate outboard ends thereof, while propulsion systems 104a, 104b are tiltably connected to the forward end of wing booms 102a, 102b. Propulsion systems 105a, 105b, are mounted to top surfaces of booms 102a, 102b, proximate the aft end of the fuselage 101. Aircraft 100 further includes a tail assembly 107 at an aft end thereof.

Each of propulsion systems 104a, 104b, 105a, 105b, 106a, and 106b may include a drive system housing comprising a pylon and a rotatable open rotor assembly comprising a plurality of rotor blades 114a, 114b, 115a, 115b, 116a, 116b connected to a rotor mast and configured to rotate about a rotor axis. As shown in FIGS. 1A and 1B, the rotor assembly of each of propulsion systems 104a, 104b, 106a, 106b includes five rotor blades; however, it should be recognized that more or fewer blades may be implemented without departing from the spirit and the scope of the embodiments described. It should also be recognized that rotor assemblies of propulsion systems 104a, 104b, may include a different number of rotor blades than rotor assemblies of propulsion systems 106a, 106b. Rotation of rotor assemblies of propulsion systems 104a, 104b, 106a, and 106b generates lift while the aircraft 100 is operating in helicopter mode and thrust while the aircraft 100 is operating in airplane mode.

In the illustrated embodiment, each boom-mounted propulsion system 105a, 105b, includes a drive system housing comprising a pylon and a rotatable open rotor assembly comprising a plurality of rotor blades connected to a rotor mast and configured to rotate about a rotor axis. As shown in FIGS. 1A and 1B, each rotor assembly of propulsion systems 105a, 105b, includes two rotor blades; however, it should be recognized that more or fewer blades may be implemented without departing from the spirit and the scope of the embodiments described. Rotation of rotor assemblies of propulsion systems 105a, 105b, generates lift while the aircraft 100 is operating in helicopter mode. It will be recognized that while rotor assemblies of propulsion systems 105a, 105b, are illustrated as being disposed above (i.e., on the top side of) booms 103a, 103b, propulsion systems 105a, 105b may alternatively be disposed under (i.e., on underside of) booms 103a, 103b.

In accordance with features of embodiments described herein, and as illustrated in FIGS. 1A and 1B, propulsion systems 106a, 106b, are disposed on the outboard ends of wing 102 and are connected to the inboard ends of wing tips 108a, 108b. Wing tips 108a, 108b, together with wing-mounted propulsion systems 106a, 106b, tilt relative to wing 102 between a first position (shown in FIG. 1A), in which propulsion systems 106a, 106b, and wing tips 108a, 108b, are configured in a hover mode, and a second position (shown in FIG. 1B), in which propulsion systems 106a, 106b, and wing tips 108a, 108b, are configured in a cruise mode. The primary benefit of wing tips 108a, 108b, which extension outboard of rotor pylon 106a, 106b, is greater efficiency in the cruise mode by adding additional wingspan. The wing tip extensions 108a, 108b rotate with rotor pylons 106a, 106b, respectively, to minimize download in hover mode, which would be due to the impingement of rotor downwash on the top surfaces of wing tips 108a, 108b.

Similarly, forward propulsion systems 104a, 104B, are tiltably connected to forward ends of booms 103a, 103b and are tiltable between a first position (shown in FIG. 1A), in which propulsion systems 104a, 104b are configured in a hover mode, and a second position (shown in FIG. 1B), in which propulsion systems 104a, 104b are configured in a cruise mode. In accordance with features of embodiments described herein, aft propulsion systems 105a, 105b are fixedly attached to booms 103a, 103b at a position located aft of the wing 102. Aft propulsion systems 105a, 105b do not convert between hover mode and cruise mode.

The position of rotor assemblies of propulsion systems 104a, 104b, 106a, 106b, as well as the pitch of individual rotor blades of all of the propulsion systems 104a, 104b, 105a, 105b, 106a, 106b, can be selectively controlled in order to selectively control direction, thrust, and lift of aircraft 100. As previously noted, propulsion systems 104a, 104b, 106a, 106b, are each convertible, relative to fuselage 101, between a vertical position (FIG. 1A) and a horizontal position (FIG. 1B). Propulsion systems 104a, 104b, 106a, 106b, are in the vertical position during vertical takeoff and landing mode. Vertical takeoff and landing mode may be considered to include hover operations of aircraft 100. Propulsion systems 104a, 104b, 106a, 106b, are in the horizontal position during forward flight mode, in which aircraft 100 is in forward flight. In forward flight mode, propulsion systems 104a, 104b, 106a, 106b, direct their respective thrusts in the aft direction to propel aircraft 100 forward. Aircraft 100 is operable to fly in all directions during the vertical takeoff and landing mode configuration of FIG. 1A, although faster forward flight is achievable while in the forward flight mode configuration of FIG. 1B. Propulsion systems 104a, 104b, 106a, 106b, may be tiltable between the vertical and horizontal positions by actuators (not shown) that are tiltable in response to commands originating from a pilot and/or a flight control system.

It should be noted that, although propulsion systems 104a, 104b, are shown and described as being tiltable between cruise and hover positions, those propulsion systems may be fixed in the hover positions, similarly to propulsion systems 105a, 105b.

In certain embodiments, when aircraft 100 is in cruise mode, the rotor assemblies of propulsion systems 105a, 105b, may cease rotation. In embodiments in which propulsion systems 104a, 104b, are also fixed (i.e., do not convert between hover and cruise modes), rotor assemblies thereof may also cease rotation when aircraft 100 is in cruise mode. For example, propulsion systems 105a, 105b, and/or 104a, 104b may stop rotation so that the rotors in the respective rotor assemblies are aligned with booms 103a, 103b in order to reduce the surface area exposed to the airstream thereby minimizing drag in the cruise mode. Fewer active rotor assemblies in cruise mode improves blade loading and propulsive efficiency of the props. In addition, stopping the aft propulsion systems 105a, 105b avoids ingestion of the wakes from the forward propulsion systems 104a, 104b, which would make the aft rotors less efficient. With six rotor assemblies, a rotor assembly can be lost while still allowing aircraft 100 to hover even without motor redundancy per rotor assembly. In the event of a rotor failure, the rotor on the opposite side of the aircraft would be powered down, allowing the aircraft to hover as a quad copter with the four remaining rotors operating at elevated power levels. In accordance with features of embodiments described herein, if the aft left rotor were to fail, the forward right rotor would also be powered down, allowing the thrust on the remaining rotors to balance. Electric power to the motors allows the distributed nature of the aircraft 100 to stay weight efficient without requiring extensive cross-connects.

In accordance with features of embodiments described herein, a drive system is coupled to each propulsion system 104a, 104b, 105a, 105b, 106a, and 106b. The drive system may include one or more fixed electric motors coupled to an off-axis tilting gearbox. The tilting configuration may have a motor attached to a drive system for reduction of RPM or the motor itself may be direct drive directly turning the respective rotor blades 114a, 114b, 115a, 115b, 116a, 116b at the desired speed. Tilting of the propulsion systems 104a, 104b, 105a, 105b, 106a, and 106b assemblies can take place with respect to the stationary motors, wing, or other stationary structure of the aircraft. The motors or motors with drive may tilt with the rotors or the motor may remain stationary with the rotor and a portion of the drive rotates. Tilting may occur with a portion of an attached wing or boom, or the wing or boom may stay fixed with only the rotor or duct pylon tilting.

Tilting pylons, such as in illustrative propulsion system 104a, 104b, include a forward tilting pylon on a boom and typically aft rotors above or below the boom. In some embodiments, the aft propulsion systems 105a, 105b may be tiltable relative to the booms 103a, 103b, respectively. A wing tip rotor, such as in illustrative propulsion system 106a, 106b, may either tilt independently of the wing or tilt with a portion of the wing (e.g., 108a, 108b) rotates with the propulsion system. In either case, the portion 108a, 108b of the wing outboard of the pylon may tilt with the pylon or may remain stationary. When rotating with the rotating pylon, all of the wing or any percentage of the wing may rotate. Minimal wing rotating with the pylon improves drag during transition from hover mode to cruise mode, as the flow on the wing remains largely attached as opposed to stalled, which can create large drag and lift issues. Allowing the wing to rotate minimizes download in hover mode due to impingement of the rotor stream on exposed airframe/wing surfaces, thereby reducing net rotor lift and power required in hover.

Because the aircraft 100 includes six rotor assemblies, the aircraft may be referred to as a "hexrotor aircraft." FIG. 1A illustrates an arc arrangement 111 of the propulsion systems 104a, 104b, 105a, 105b, 106a, and 106b when aircraft 100 is in hover mode. In particular, to allow the minimum number of rotors and still allow loss of a rotor as a recoverable failure mechanism in a hover, the rotors are arranged in an arc arrangement 111 both side-to-side and forward-to-aft. As a result, when one rotor is lost and a second rotor is powered down, the aircraft can still be balanced as a quad arrangement on the remaining rotors. If a linear arrangement were used, the power and balance requirements would prevent recovery on just four rotors. Multi-copters with more than six rotors may recover by offsetting opposing rotors, but six in the illustrated arc arrangement 111 allows a recovery after failure and results in significant weight savings due to fewer redundant motors and rotors.

One or more control surfaces or effectors (not shown) may be included on the fuselage 101, wing 102, or tail 107, such as one or more aileron, elevator, horizontal stabilizer, vertical stabilizer, flap, slat, spoiler, or rudder. Such control surfaces are used to control or stabilize flight of the aircraft 100 in certain flight modes. For example, flight control devices, such as ailerons, elevators, and rudders, may be used for aircraft control during cruise mode flight.

In some configurations, fuselage 101 has a cockpit 109 that includes displays, controls, and instruments. In some embodiments, cockpit 109 is configured to accommodate one or more pilots and/or passengers. It is contemplated, however, that aircraft 100 may be operated remotely, in which case cockpit 109 could be configured as a fully functioning cockpit to accommodate a pilot (and possibly a co-pilot as well) to provide for greater flexibility of use or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, aircraft 100 could be configured as an unmanned vehicle, in which case cockpit 109 could be eliminated entirely in order to save space and cost.

In some embodiments, a fly-by-wire (FBW) system 110 in aircraft 100 sends electrical signals to the propulsion systems 104a, 104b, 105a, 105b, 106a, and 106b and other control surfaces or effectors in response to a pilot's inputs to flight controls in cockpit 109. For example, the tilting and speed of propulsion systems 104a, 104b, 106a, and 106b, the pitch of rotor blades 114a, 114b, 115a, 115b, 116a, 116b, and/or the movement of other effectors may be controlled by inputs from the FBW system 110. FBW systems are more complex than simple mechanical analog systems and provide greater flexibility in aircraft control. In an FBW system, a flight computer, which may be multiply redundant, receives control inputs from the pilot and translates those inputs electronically via electronic actuators into motion of the aircraft control surfaces and effectors. A flight computer may not only translate these motions but may also make real-time corrections to control surfaces to maintain stable flight that would not be feasible without high-speed corrections by the flight computer.

FIGS. 2A and 2B illustrate an example tiltrotor aircraft 200 that includes ducted rotors (or fans). Tiltrotor aircraft 200 is convertible between a helicopter mode (shown in FIG. 2A), which allows for vertical takeoff and landing, hovering, and low speed directional movement, and an airplane mode (shown in FIG. 2B), which allows for forward flight as well as horizontal takeoff and landing.

Aircraft 200 comprises a fuselage 201 with fixed wings 202, 203 that extend from the fuselage 201 and a plurality of rotatable ducts 204a-d that are coupled to the fuselage 201 or the wings 202, 203. Each duct 204a-d houses a power plant for driving rotation of an attached rotor 205a-d. Each rotor 205a-d has a plurality of rotor blades 206 configured to rotate within ducts 204.

In the illustrated embodiment, aircraft 200 is configured with four ducts 204a-d, including two ducts 204a and 204b that form a forward pair of ducts and two ducts 204c and 204d that form an aft pair of ducts. Each duct 204a-d is rotatably coupled to fuselage 201 of aircraft 200 via a spindle. Ducts 204a and 204b are coupled directly to fuselage 201 by a respective spindle 207. Ducts 204c and 204d are each independently coupled to a corresponding end of wing 203 via a respective spindle 208. As shown, each of ducts 204c and 204d includes a winglet 209a, 209b that is coupled thereto. It should be appreciated that aircraft 200 is not limited to the illustrated configuration having four ducts 204, and that aircraft 200 may alternatively be implemented with more or fewer ducts 204. For example, an additional pair of ducts (not shown) may be coupled to the aft section of fuselage 201 behind wings 202, 203.

The position of ducts 204a-d, and optionally the pitch of blades 206, can be selectively controlled to control direction, thrust, and lift of rotors 205a-d. For example, ducts 204a-d are repositionable to convert aircraft 200 between a helicopter mode and an airplane mode. As shown in FIG. 2A, ducts 204a-d are positioned such that aircraft 200 is in helicopter mode, which allows for vertical takeoff and landing, hovering, and low-speed directional movement. As shown in FIG. 2B, ducts 204a-d are positioned such that aircraft 200 is in airplane mode, which allows for high-speed forward-flight. In airplane mode, ducts 204a-d direct their respective thrusts in the aft direction to propel aircraft 200. Aircraft 200 is operable to fly in all directions during the vertical takeoff and landing (i.e., helicopter) mode configuration of FIG. 2A, although faster forward flight is achievable while in the forward flight (i.e., airplane) mode configuration of FIG. 2B2. Ducted fans 204a-d may be tiltable between the vertical and horizontal positions by spindles 207, 208, which are rotatable in response to commands originating from a pilot and/or a flight control system of the aircraft 200.

Like rotorcraft 100, tiltrotor aircraft 200 may have an FBW system 210 that sends electrical signals to control aircraft actuators and effectors, such as actuators that control the position of rotatable ducts 204a-d and/or the pitch of rotor blades 206. Also, like aircraft 101, tiltrotor aircraft 200 may be configured for manned or unmanned flight, such as where cockpit 211 may be configured to accommodate a pilot or to be operated remotely.

It should be appreciated that aircraft 100 and 200 are merely illustrative of a variety of aircraft that can implement the embodiments disclosed herein. Other aircraft implementations may include, for example, hybrid aircraft, fixed wing aircraft, unmanned aircraft, gyrocopters, drone aircraft, and other tiltrotor and helicopter configurations, to name a few examples.

FBW systems are provided in aircraft, such as FBW 110 and 210 in aircraft 100 and 200, to assist pilots in stably flying the aircraft and to reduce workload on the pilots. Typical FBW systems provide different control characteristics or responses for stick, throttle, cyclic, collective, or pedal control input in the different flight regimes and may provide stability assistance or enhancement by decoupling physical flight characteristics so that a pilot is relieved from needing to compensate for some flight commands issued to the aircraft. FBW systems may be implemented in one or more flight control computers (FCCs) disposed between inceptors (e.g., pilot controls) and effectors (e.g., flight control surfaces and propulsion systems). The FBW systems provide responses to flight control inputs that assist in operating the aircraft more efficiently or that put the aircraft into a stable flight mode, while still allowing the pilot to override the FBW control inputs. The FBW systems in an aircraft may, for example, automatically adjust power output by the engine to match a control input, adjust rotor pitch in response to a control input, provide automation of one or more flight control procedures, provide for default or suggested control positioning, or the like.

In some embodiments, the FBW system includes an autopilot function that provides automatic flight control for the aircraft. The autopilot may be capable of controlling some or all aircraft flight parameters, such as maintaining speed, heading, or altitude, or managing operations, such as hovering and navigating. The autopilot can relieve a pilot of time-intensive tasks and reduce the pilot's workload.

In some embodiments, the autopilot system provides flight commands to a flight control computer. The flight control computer interprets the flight commands and controls effectors and actuators for control surfaces such as ailerons, flaps, elevators, and rudder. In response to the autopilot's commands, the flight control computer may also signal actuators that control an angular position of the proprotors for a tiltrotor aircraft as well as the pitch or angle of attack for rotor blades. In various embodiments, the effectors may be electric motors and may in various embodiments may be, for example, swashplate actuators, nacelle-position actuators, throttle actuators, landing-gear actuators, or any other type of actuator for controlling a flight parameter. The effectors may also include, for example, rotors, rotor cyclic controls, rotor/propellor collective control, electric motor speed, torque, or current command, propellors, ailerons, rudders, elevators, etc.

FIG. 3 is a block diagram showing an exemplary FBW system 300 for an aircraft. FBW system 300 may incorporate various control laws for responding to pilot inputs. System 300 may be implemented on any aircraft having an effector that is controllable via a pilot interface and/or an autopilot controller for providing automatic control of the effector. A pilot interface 301 receives control inputs, such as from one or more inceptor in a cockpit, for transmitting control inputs to an effector 302, such as a control surface, rotor blade, ducted rotor, etc. The control inputs may be transmitted directly to effector 302 via a mechanical linkage 303, or control signals may be transmitted to an actuator 304 of effector 302 via a signaling path 305 (e.g., in a fly-by-wire arrangement), or some combination of these may be employed. Actuator 304 may be, for example, a hydraulically powered or electrically powered actuator that responds to electrical control signals from pilot interface 301 or from an FCC, such as autopilot controller 306, flight controller 307, flight director, waypoint navigator, navigation computer, or other navigation solution.

Autopilot controller 306 may receive input commands from a flight controller 307 and transmit commands to a servo 308 adapted to drive effector 302 based on the input commands. Servo 308 may drive effector 302 directly or may drive mechanical linkage 303 or actuator 304. Effector 302 is for example one or more of an aileron, elevator, horizontal stabilizer, flap, slat, spoiler, or rudder. Alternatively, effector 302 may represent an engine control, rotor blade actuator, or proprotor configuration/tilt actuator. Although only one effector 302 is depicted in FIG. 3 for clarity of illustration, in practice system 300 is used to control a plurality of effectors onboard an aircraft.

Pilot interface 301 may be, for example, one or more active inceptor, control wheel, center stick, yoke, cyclic, collective, or other interface located onboard the aircraft or remotely (e.g., by a pilot of an unmanned aerial vehicle (UAV)). In certain embodiments, pilot interface 301 may include a first set of interfaces for a pilot and a second set of interfaces for a copilot (not shown), with the first and second sets of interfaces configured to move in concert via one or more force feedback mechanisms or mechanical linkages (e.g., a roll mechanical linkage and a pitch mechanical linkage). In some embodiments, mechanical linkage 303 includes a known mechanical gearing that mechanically couples pilot interface 301 with servo 308. During autopilot operation, pilot interface 301 may move according to command inputs implemented by autopilot controller 306 via mechanical linkage 303.

One or more sensors 309 are mechanically coupled to pilot interface 301 for measuring a position of pilot interface 301. For example, sensor 309 may be one or more rotary variable differential transformers (RVDTs) used to measure movement of pilot interface 301 (e.g., an inceptor and/or a control stick pivot angle). In certain embodiments, sensor 309 includes a plurality of RVDTs configured as a set for determining an angle in a three-axis (e.g., X, Y, Z) space for commanding aircraft motions. Sensor 309 may also measure rotation of the pilot interface 301 around an input device's axis (e.g., measuring the twisting or rolling rotation of an inceptor independent of any tilting rotation).

Flight controller 307 has a memory 310, including a non-transitory medium for storing software 311, and a processor 312 for executing instructions of software 311. Memory 310 in some embodiments is a memory system that includes both transitory memory such as RAM and non-transitory memory such as, ROM, EEPROM, Flash-EEPROM, magnetic media including disk drives, and optical media. Memory 310 stores software 312 as machine readable instructions executable by processor 312. In certain embodiments, flight controller 307 includes one or more flight computers (e.g., a primary flight computer and a backup flight computer). Flight controller 307 is configured to communicate with pilot interface 301, sensor 309, autopilot controller 306, effector 302, and actuator 304 by one of a wired and/or wireless communication medium. Exemplary instructions of software 311 and/or 314 include control law instructions.

Autopilot controller 306 has a memory 313, including a non-transitory medium for storing software 314, and a processor 315 for executing instructions of software 314. In certain embodiments, autopilot controller 306 includes one or more microprocessor, microcontroller, programmable logic controller, and printed circuit boards. Autopilot controller 306 is adapted to communicate with servo 308 and flight controller 307 by one of a wired and/or wireless communication medium. In certain embodiments, autopilot controller 306 and servo 308 are implemented as an integrated autopilot servo device, such as a roll autopilot servo for driving effector 302 (e.g., a roll spoiler and/or an aileron) for providing roll function. Autopilot controller 307 determines command signals for commanding servo 308 based on a bank angle and/or a roll rate (e.g., from sensor 309 or primary flight controller 307), and in some embodiments, based on air data from controller 307.

Autopilot 306 may be engaged and directed to maintain a commanded state, such as desired heading, airspeed, or altitude, for example. The desired parameter may be input using pilot interface 301 by an onboard or remote pilot. Software instructions 314 include an algorithm that applies a control law to drive the aircraft to the commanded state using autopilot commands to one or more effector 302. Once within the desired parameters, autopilot 306 then maintains that state by generating corrective command signals to effector 302.

In certain embodiments, autopilot controller 306 may lack information about an absolute position of servo 308. As such, a sensor 316 may optionally be coupled with servo 308 for determining a position of servo 308. For example, sensor 316 may be a set of hall-effect sensors positioned around an electrical motor shaft of servo 308 for determining an angular rotation position of the electrical motor shaft. Alternatively, sensor 316 may be coupled to mechanical linkage 303 for determining a position of servo 308. In some embodiments, servo 308 drives both a roll spoiler and an aileron in a coordinated manner for providing roll functionality, and sensor 316 may be used to determine a position of both the roll spoiler and the aileron.

Flight controller 307 and autopilot controller 306 measure a response of the aircraft to commands. In various embodiments, the flight controller 307 and autopilot controller 306 measure the aircraft response by measuring flight parameters, such as, for example, actual altitude, actual rate of climb, actual airspeed, actual heading, and other flight parameters. Such parameters may be measured using, for example, airspeed sensor 317, altitude sensor 318, and heading sensor 319. Sensors 317-319 may be associated with an aircraft pitot static system, compass, GPS, navigation system, accelerometers, etc. Other sensors 320 may also be used to provide aircraft state data to autopilot controller 306 and primary flight controller 307.

Traditional tiltrotor aircraft have conventional flight controls such as a throttle, cyclic, collective, and antitorque pedals. Emerging technologies in aviation seek to implement simplified vehicle operations (SVO) to reduce pilot workload. This would include, for example, doing away with conventional inceptors and replacing them with a much simpler and more intuitive interface. Using automation coupled with human factors best practices can reduce the quantity of trained skills and knowledge that a pilot must acquire to operate an aircraft at the required level of operational safety. The use of automation capabilities can offset pilot training requirements.

FIG. 4 illustrates an example embodiment of a flight control configuration 400 that allows for SVO. Configuration 400 uses dual sidesticks 401, 402 as the only flight control inputs. Configuration 400 may be used in a cockpit of a tiltrotor aircraft, such as in cockpit 109 or 211 in aircraft 100 or 200. Dual sidesticks 401, 402 may be positioned on side panels or consoles 403, 404 of a cockpit in one configuration. In other configurations, each sidestick 401 and 402 may be mounted on an armrest, pedestal, or other support that enables a pilot to conveniently hold the sidesticks. Configuration 400 is adaptable to a traditional cockpit layout having an instrument panel 405 having any number or types of displays as appropriate for the expected flight conditions and mission of the aircraft.

The aircraft control logic is mapped to movement of dual sidesticks 401, 402 in a specific way to provide intuitive and safe operation of the aircraft. Generally, the left-hand sidestick 401 controls aircraft translations, the right-hand sidestick 402 controls aircraft rotation and flight path. These inputs are consistent with traditional fixed-wing pilot experience. Configuration 400 allows for automated flight mode changes for sidesticks 401, 402 as a function of aircraft speed. Erroneous mode transitions are prevented in one embodiment by a tactile soft-stop on the left-hand sidestick 401. Configuration 400 removes the need for pedals in the cockpit since yaw and sideslip are addressed by the FBW control laws. Similarly, there is no need for either sidestick to provide control inputs via a twisting motion, such as yaw inputs, which avoids the potential for cross inputs when moving an individual sidestick 401, 402. Each sidestick 401, 402 has a two-dimensional freedom of movement that allows for fore-and-aft movement and for side-to-side movement.

Left-hand sidestick 401 provides translation control for the aircraft. Fore-and-aft movement 407a, 407b of left-hand sidestick 401 provides a fore/aft translation-rate command input that blends into an acceleration command when the left-hand sidestick 401 is displaced beyond a threshold angle. This fore-and-aft movement 407a, 407b of left-hand sidestick 401 can be characterized as a longitudinal input to the aircraft. Side-to-side movement 408a, 408b of left-hand sidestick 401 provides a side-to-side translation-rate command. This side-to-side movement 408a, 408b of left-hand sidestick 401 can be characterized as a lateral input to the aircraft.

Right-hand sidestick 402 provides translation control for the aircraft. Fore-and-aft movement 409a, 409b of right-hand sidestick 402 provides a height-rate command input that blends into a flight-path-rate command when the right-hand sidestick 402 is displaced beyond a threshold angle. This fore-and-aft movement 409a, 409b of right-hand sidestick 402 provides a pitch input to the aircraft. Side-to-side movement 410a, 410b of right-hand sidestick 402 can be characterized as a yaw-rate command that blends to roll-rate command when the right-hand sidestick 402 is displaced beyond a threshold angle. This side-to-side movement 410a, 410b of right-hand sidestick 402 can be characterized as a roll input to the aircraft.

FIG. 5 is a perspective view of an illustrative example of an inceptor 500 that may be used with embodiments disclosed herein. Inceptor 500 be referred to as a sidestick, control stick, controller, or flight command input in other arrangements. Inceptor 500 function as a flight control, such as sidesticks 401, 402 in a fly-by-wire tiltrotor aircraft. In this example, inceptor 500 includes a stick grip 501 that can be held in the hand of a pilot. The example inceptor 500 is adapted for a left hand, but grip 501 may be configured to be held in either a left or right hand. For use with the embodiments disclosed herein, grip 501 requires only two degrees of freedom of movement, namely movement in the X and Y directions (i.e., longitudinally, and laterally). In other arrangements, inceptor 500 may also detect movement in the Z direction (i.e., push grip 501 toward or pull grip 501 away from console panel 502). In other embodiments, inceptor may further detect rotation of grip 501, such as a twisting motion 503 around axis 504. The rotation of grip 501 may be measured as an angle θ relative to a neutral or reference position.

Inceptor 500 is mounted on a sensor array 505 that detects rotation of grip 501 around a spherical mount 506 in the X and Y directions. Sensor array 505 generates corresponding digital or analog signals representing the respective movement in the X and Y directions and outputs those signals 507, 508 to an FCC, FBW system, Flight Control System (FCS), or other component. Sensor array 506 may also be configured to measure movement of grip 501 in the Z direction and a rotation angle θ corresponding to twisting of grip 501. Sensor array 505 generates corresponding digital or analog signals representing the movement in the Z direction and the rotation angle θ and outputs those signals 509, 510 to the FBW system or any other appropriate aircraft system. For example, movement in the Z direction and the rotation angle θ may be used to control cockpit displays, navigation systems, communication systems, or other components.

Inceptor 500 may have additional inputs, such as switches and buttons 511, 512, that are used for functions including navigation, communication, aircraft trim, auxiliary equipment operation (e.g., spotlights, winches, etc.), weapon selection or release, and the like.

Although the example inceptor 500 is shown as configured for pivoting motion around a spherical mount 506, in other arrangements inceptor 500 may move in a sliding motion in one or more direction or degree of freedom. For example, inceptor 500 may move longitudinally along a slot in console panel 502 (not shown) to provide a Y input while capable of rotating laterally to provide an X input.

Inceptor 500 may be a passive inceptor with a fixed force/feel characteristic that is provided by springs and dampers. The passive inceptor does not provide tactile cues about the airplane current situation to the pilot holding grip 501. Flight control systems that use passive sidesticks rely on the flight control laws within the aircraft's FCC or FBW system to keep the aircraft within a safe operating envelope. The flight control system does not allow the aircraft's limits to be exceeded no matter what inputs a pilot applies to the system via the side sticks.

In another embodiment, inceptor 500 is an active inceptor that has a servo-actuator mechanism that provides a force/feel characteristic to the grip 501. For example, sensor array 505 may be configured to provide force/feel feedback to grip 501 using a feedback generator 512. For example, when grip 501 is displaced in the X or Y direction from a neutral position, a pilot may feel a resistive force (i.e., tactile feedback) tending to return the grip 501 to the neutral position. The resistive force created by the feedback generator 512 may be constant through the entire range of movement of grip 501, or the resistive force may increase as the displacement of grip 501 increases so that more force is required to move grip 501 as it gets farther from the neutral position in angle, distance, or range. The variable force/feel characteristic can be varied throughout the range of motion of grip 501 and hence this function can be used to provide tactile cues to the pilot that are pertinent to a current flight condition. The relevant force/feel commands are chosen to provide the correct feel depending on the flight condition. The force/feel characteristic may be continuously updated by the FCC or FBW system in real-time to reflect the current aircraft situation or the force/feel characteristic may be dependent only upon the amount or degree of deflection of grip 501.

The force/feel generated by feedback generator 512 may be in the form of a "soft" stop or limit. That is to say, the feedback generator 512 may inhibit the pilot from moving the grip 501 to a particular position beyond a threshold deflection from the neutral position. In some configurations, the soft stop may represent a safe operational envelope. Alternatively, a gradual increase in resistive force is applied to grip 501 by the feedback generator 512 as a limit is approached or passed. Soft stops let the pilot know that a limit has been reached but allow the pilot to exceed the limit by applying additional force to grip 501 to push through the soft stop.

In other configurations, feedback generator 512 may generate a "hard" stop or limit beyond which grip 501 cannot be moved. Physical construction of inceptor 500 may also provide a hard stop, such as a collar or rail around grip 501 that prevents deflection beyond a set angle, distance, or range. Such hard stops let the pilot know that input command has reached a maximum range.

Additional tactile feedback may be provided to a pilot via inceptor 500 using feedback generator 512. For example, feedback signals such as a vibration, buzz, shake, or judder may be triggered when the aircraft is in or approaching an unsafe flight condition or may be initiated as notification of some event related to the aircraft navigation, communication, or other systems.

In an example configuration, such as shown in FIG. 4, sidesticks 401, 402 may be passive inceptors with centering and soft stops. FIG. 6A is a graph 600 illustrating the longitudinal force characteristics for a left-hand sidestick in the example configuration. Fore-and-aft movement of the left-hand sidestick provides a forward/aft translation-rate command input that blends into an acceleration command at higher displacement angles. The force characteristics for longitudinal movement of the left-hand sidestick follow linear segments 601, 602, 603, 604, wherein the force required to move the sidestick is proportional to the degree of sidestick displacement. When operating between ±5 degrees of longitudinal displacement, the force required to move the left-hand sidestick follows curve 601 or 603.

The left-hand sidestick has soft-stops 605, 606 at approximately ±5 degrees of longitudinal displacement. The soft-stops 605, 606 are engaged when approximately 10 pounds of force are applied to the left-hand sidestick. The pilot can push the left-hand sidestick past the forward or aft soft-stops 605, 606 by increasing the applied force above approximately 12 pounds. The force required to move the left-hand sidestick beyond the ±5 degrees region follows curves 602, 604.

When the left-hand sidestick is within the soft-stops 605, 606 and the aircraft's longitudinal velocity is less than 12 kts, the FCS control laws are in a TRC mode, which is used to enable low-speed precise maneuvering flight. In this region, the left-hand sidestick's longitudinal motion controls aircraft longitudinal velocity within the limits of ±10 kts. The aircraft remains in hover mode (i.e., all propulsion system pylons are pointed up at) 90°±5° while operating along curves 601, 603 of graph 600. When the left-hand sidestick is released (i.e., self-centering to a neutral position), the aircraft decelerates to zero speed and the aircraft's ground position (e.g., GPS location) is held constant.

When the left-hand sidestick is pushed past the sidestick soft-stops 605, 606, and if the longitudinal velocity is above 12 kts, then TRC mode is exited. When moved past the soft-stops 605, 606 (i.e., operating on curve 602 or 604), the left-hand sidestick longitudinal motion no longer controls velocity but instead commands a longitudinal acceleration/deceleration.

If the left-hand sidestick position is maintained past the forward soft-stop 605, then the aircraft FCS will convert the propulsion systems pylons from the 90° position toward the 0° position (i.e., rotate the propulsion system pylons from hover mode to cruise mode) and will begin to modulate the rotor blade pitch to maintain the commanded acceleration level. When the left-hand sidestick is released (back to detent), the aircraft stops accelerating, and airspeed is held constant. A pilot warning may be posted if acceleration is stopped during the conversion mode to indicate that propulsion system pylon configuration is not energy efficient. No command is issued to the FCS in response to left-hand sidestick movement between soft-stops 605, 606 when the aircraft has entered cruise mode.

If the left-hand sidestick is maintained past the aft soft-stop 604, the aircraft modulates blade pitch on the rotors to maintain a commanded deceleration level. The FCS will convert the propulsion system pylons from the 0° position to the 90° position as required based on airspeed. When the left-hand sidestick is released (back to detent), the aircraft stops decelerating, and airspeed is held constant. A pilot warning may be posted if acceleration is stopped during the conversion mode to indicate that the propulsion system pylon configuration is not energy efficient. No command is issued to the FCS in response to left-hand sidestick movement between soft-stops 605, 606 while the aircraft is still operating in cruise mode.

FIG. 6B is a graph 610 illustrating the lateral force characteristics for the left-hand sidestick in the example configuration. Side-to-side movement of left-hand sidestick provides a side-to-side translation-rate command. The force characteristics for lateral movement of the left-hand sidestick follow linear segments 611, 612, wherein the force required to move the sidestick is proportional to the degree of sidestick displacement.

Left and right hard stops 613, 614 are configured for the left-hand sidestick. Within hard-stops 613, 614, lateral motion of the left-hand sidestick controls lateral aircraft velocity within limits of ±10 kts. The aircraft remains in a hover mode (i.e., all propulsion system pylons are pointed up at) 90°±5° throughout that range. When the left-hand sidestick is released (back to detent), the aircraft decelerates to zero velocity, and the aircraft's ground position (GPS) is held constant.

The left-hand sidestick lateral hard-stops 613, 614 are set to ±5 deg when the left-hand sidestick's longitudinal position is within the TRC range and are set to 0 deg (i.e., no lateral motion permitted) outside of the TRC range. The lateral hard-stop 613, 614 positions may be set via a mechanical cam on the sidestick or using a side console top plate surrounding the sidestick.

In some embodiments, the feel gradient experienced by a pilot is higher when deflecting the left-hand sidestick to the right than when deflecting to the left in order to account for typical human biomechanical bias.

In some arrangements, the left-hand sidestick grip includes a guarded switch. When depressed, the guarded switch commands an automated transition to a minimum cruise speed when in the hover mode or an automated transition to zero-speed hover mode when in the cruise mode.

FIG. 7A is a graph 700 illustrating the longitudinal force characteristics for a right-hand sidestick in the example configuration. Fore-and-aft movement of the right-hand sidestick provides a height-rate command input that blends into a flight-path-rate command. The force characteristics for longitudinal movement of the right-hand sidestick follow linear segments 701, 702, wherein the force required to move the sidestick is proportional to the degree of sidestick displacement.

In hover mode, longitudinal motion of the right-hand sidestick controls aircraft height rate (altitude) within limits of ±15 feet-per-second (fps). When the right-hand sidestick is released (back to detent), the aircraft maintains a level altitude.

In conversion mode and cruise mode, longitudinal motion of the right-hand sidestick controls flight path change rate within limits of ±5 deg/sec. When the of the right-hand sidestick is released (back to detent), the aircraft maintains flight path angle.

In some arrangements, the right-hand sidestick grip includes a first switch. When depressed, the first switch commands an automated transition to constant altitude flight (altitude hold) when in cruise mode.

FIG. 7B is a graph 710 illustrating the lateral force characteristics for the right-hand sidestick in the example configuration. Side-to-side movement of right-hand sidestick can be characterized as a yaw-rate command that blends to roll-rate command. The force characteristics for lateral movement of the left-hand sidestick follow linear segments 711, 712, wherein the force required to move the sidestick is proportional to the degree of sidestick displacement.

In hover mode, lateral movement of the right-hand sidestick controls aircraft yaw rate within limits of ±15 deg/sec. When the right-hand sidestick is released (back to detent), the aircraft maintains a heading or bearing.

In conversion mode and cruise mode, lateral movement of the right-hand sidestick controls aircraft roll rate within limits of ±20 deg/sec. When the right-hand sidestick is released (back to detent), the aircraft maintains a bank angle, which results in a constant heading-change rate.

In some arrangements, the right-hand sidestick grip includes a second switch. When depressed, the second switch on the right sidestick grip commands an automated transition to fixed heading flight (heading hold) when in cruise mode and allows for fine left/right heading angle adjustment.

An additional switch, such as a panel-mounted switch or third switch on the right-hand sidestick grip, allows for selecting between an aircraft-body axis heading mode and a ground track mode.

In some embodiments, the feel gradient experienced by a pilot is higher when deflecting the right-hand sidestick to the left than when deflecting to the right in order to account for typical human biomechanical bias.

Use of dual sidesticks as disclosed herein along with the specific way in which aircraft control logic is mapped to the dual sidesticks provides for intuitive and safe tiltrotor aircraft operation. The configuration disclosed herein prevents unsafe aircraft mode transitions by providing pilots with haptic feedback via inceptor soft-stops. This allows pilots with small aircraft (FAA Part 23) experience to safely and efficiently operate Urban Air Mobility (UAM) and Advanced Air Mobility (AAM) aircraft, such as highly automated aircraft that operate and transport passengers or cargo at lower altitudes within urban and suburban areas.

It will be understood that graphs 600, 610, 700, 710 in FIGS. 6A,B and 7A,B are merely examples and that in other configurations the force rates, positions of soft stops and hard stops, TRC mode parameters, altitude rate limits, flight path change rate limits, yaw rate limits, and roll rate limits may be different.

FIG. 8 is a chart 800 illustrating flight control function for a tiltrotor aircraft using a dual inceptor pilot controls across different flight modes 801 and airspeeds 802. A left-hand inceptor provides a longitudinal input 803 and a lateral input 804. A right-hand inceptor provides a longitudinal input 805 and a lateral input 806. The tiltrotor aircraft operates in three flight modes: hover 807 (propulsion systems vertical at) ~90°, cruise 809 (propulsion systems horizontal at) ~0°, and conversion mode 808 (propulsion systems between the 90° hover position and the 0° cruise position). In hover mode 807, all of the aircraft lift is powered by the propulsion systems. In cruise mode 809, the aircraft wings create all or most of the lift. In conversion mode 808, the aircraft uses a semi-powered lift as the lift transitions between the propulsion systems and the wings.

Longitudinal movement of the left-hand inceptor 803 initially creates a velocity in the X dimension (forward/aft) and transitions to an acceleration if the movement is continued. The transition may occur when the left-hand inceptor 803 is moved beyond a threshold position, such as a soft stop, or if the aircraft is operating above a threshold velocity. While operating in the hover mode, the aircraft will hold position in the X dimension when the left-hand inceptor is released or manually placed in a neutral detent position. As the aircraft accelerates into the conversion and cruise modes 808, 809, releasing the left-hand inceptor to an in-detent position will function as a velocity hold.

Lateral movement of the left-hand inceptor 804 creates a velocity in the Y dimension (left/right). If the movement is continued the side-to-side velocity will increase but no acceleration or other response is induced. The left-hand inceptor 804 may have hard stops that prevent movement beyond a threshold lateral position. While operating in the hover mode, the aircraft will hold position in the Y dimension when the left-hand inceptor 804 is released or manually placed in a neutral detent position.

Longitudinal movement of the right-hand inceptor 805 initially creates an altitude rate change and transitions to flight path rate change if the movement is continued. The transition from altitude control to flight path control may occur, for example, when the aircraft is operating above a threshold velocity. While operating in the hover mode, the aircraft will hold altitude when the right-hand inceptor is released or manually placed in a neutral detent position. As the aircraft accelerates into the conversion and cruise modes 808, 809, releasing the right-hand inceptor 805 to an in-detent position will function as a flight path hold.

Lateral movement of the right-hand inceptor 806 creates a yaw rate change. If the movement is continued, the yaw rate change will transition to a roll rate change as the aircraft accelerates into the conversion and cruise modes 808, 809. While operating in the hover mode, the aircraft will hold heading when the right-hand inceptor is released or manually placed in a neutral detent position. In the conversion and cruise modes 808, 809, releasing the right-hand inceptor 806 to an in-detent position will function as a heading rate hold.

While the aircraft's velocity is operating at low velocity (approximately ±10 kts maximum), the left-hand inceptor will function in a TRC mode 810 and longitudinal and lateral inputs 803, 804 will function as position control for the hovering aircraft.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

The diagrams in the Figures illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims.

The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment," "example embodiment," "an embodiment," "another embodiment," "certain embodiments," "some embodiments," "various embodiments," "other embodiments," "alternative embodiment," and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

What is claimed is:

1. A flight control system for a tiltrotor aircraft, comprising:
   a plurality of propulsion systems each independently tiltable between a vertical position and a horizontal position by aircraft effectors; and
   a flight control computer configured to control the aircraft effectors in response to inputs from inceptors, the flight control computer comprising one or more processors and a memory, wherein the memory stores instructions for controlling aircraft effectors, the instructions causing the flight control computer to perform the steps of:
   converting a signal representing longitudinal motion of a first inceptor into a fore-and-aft translational rate command for the tiltrotor aircraft;
   converting the signal representing longitudinal motion of the first inceptor into an aircraft acceleration command when the longitudinal motion of the first inceptor has exceeded a threshold position and the tiltrotor aircraft has exceeded a threshold velocity;
   converting a signal representing lateral motion of the first inceptor into a side-to-side translational rate command for the tiltrotor aircraft;
   converting a signal representing longitudinal motion of a second inceptor into a height rate command for the tiltrotor aircraft; and
   converting a signal representing lateral motion of the second inceptor to a yaw rate command for the tiltrotor aircraft.

2. The flight control system of claim 1, wherein the threshold position is determined by a soft stop in the first inceptor.

3. The flight control system of claim 1, wherein the instructions further causing the flight control computer to perform the steps of:
   determining that the tiltrotor aircraft has transitioned out of a hover mode, wherein the propulsion systems have a generally vertical orientation in the hover mode; and
   converting the signal representing a longitudinal motion of the second inceptor into a flight path change rate command for the tiltrotor aircraft.

4. The flight control system of claim 3, wherein the instructions further causing the flight control computer to perform the steps of:
   when the second inceptor is released, maintaining an aircraft flight path angle.

5. The flight control system of claim 1, further comprising:
   hard stops adapted to prevent lateral movement of the first inceptor beyond the threshold position.

6. The flight control system of claim 1, wherein the threshold position varies depending on aircraft mode.

7. The flight control system of claim 1, wherein the instructions further causing the flight control computer to perform the steps of:
   when longitudinal motion of the first inceptor is held beyond the threshold position, transitioning aircraft propulsion systems from a hover mode to a cruise mode, wherein the propulsion systems have a generally vertical orientation in the hover mode and a generally horizontal orientation in the cruise mode.

8. A flight control system for a tiltrotor aircraft, comprising:
   a plurality of propulsion systems each independently tiltable between a vertical position and a horizontal position by aircraft effectors; and
   a flight control computer configured to control the aircraft effectors in response to inputs from inceptors, the flight control computer comprising one or more processors and a memory, wherein the memory stores instructions for controlling aircraft effectors, the instructions causing the flight control computer to perform the steps of:
   converting a signal representing longitudinal motion of a first inceptor into a fore-and-aft translational rate command for the tiltrotor aircraft;
   converting a signal representing lateral motion of the first inceptor into a side-to-side translational rate command for the tiltrotor aircraft;
   converting a signal representing longitudinal motion of a second inceptor into a height rate command for the tiltrotor aircraft;
   converting a signal representing lateral motion of the second inceptor to a yaw rate command for the tiltrotor aircraft; and
   controlling a position of the tiltrotor aircraft using a Translational Rate Control (TRC) mode when an airspeed of the tiltrotor aircraft is below a threshold speed, and wherein, during the TRC mode when the first inceptor is released, decelerating the tiltrotor aircraft to zero speed and holding a constant ground position.

9. The flight control system of claim 1, wherein the tiltrotor aircraft effectors are one or more of a rotor cyclic control, a rotor/propellor collective control, an electric motor speed, torque, or current command, a control surface, a rotor, a propellor, or an actuator configured to control the position of the propulsion system, control surface, rotor, or propellor.

10. The flight control system of claim 1, further comprising:
   a switch configured to command an automated transition to a minimum cruise speed when the tiltrotor aircraft is operating in a hover mode and to command an automated transition to a zero speed hover mode when the tiltrotor aircraft is operating in a cruise mode, wherein the propulsion systems have a generally vertical orientation in the hover mode and a generally horizontal orientation in the cruise mode.

11. An tiltrotor aircraft comprising:
a fuselage;
a cockpit within the fuselage, the cockpit including a first inceptor and a second inceptor;
a wing connected to the fuselage;
a first set of propulsion systems;
a second set of propulsion systems;
wherein each propulsion system includes a rotor assembly comprising a plurality of rotor blades, and wherein at least one of the first and second sets of propulsion systems are tiltable between a first position when the tiltrotor aircraft is in a hover mode and a second position when the tiltrotor aircraft is in a cruise mode; and
a flight control system configured to control the first and second sets of propulsion systems in response to inputs from the first and second inceptors, the flight control computer adapted to:
 convert a signal representing longitudinal motion of the first inceptor into a fore-and-aft translational rate command for the tiltrotor aircraft;
 convert a signal representing lateral motion of the first inceptor into a side-to-side translational rate command for the tiltrotor aircraft;
 convert a signal representing longitudinal motion of the second inceptor into a height rate command for the tiltrotor aircraft; and
 convert a signal representing lateral motion of the second inceptor to a yaw rate command for the tiltrotor aircraft;
 wherein the flight control computer is further adapted to determine that the longitudinal motion of the first inceptor has exceeded a threshold position and that the tiltrotor aircraft has exceeded a threshold velocity, and to convert the signal representing longitudinal motion of the first inceptor beyond the threshold position into an acceleration command for the tiltrotor aircraft, wherein the threshold position is determined by a soft stop in the first inceptor.

12. The tiltrotor aircraft of claim 11, further comprising:
a third set of propulsion systems, wherein the flight control system is further configured to control the third set of propulsion systems in response to inputs from the first and second inceptors; and wherein the propulsion systems collectively comprise a hexrotor configuration when the tiltrotor aircraft is in the hover mode.

13. The tiltrotor aircraft of claim 11, wherein the flight control computer is further adapted to transition the propulsion systems from a hover mode to a cruise mode when the longitudinal motion of the first inceptor is held beyond the threshold position.

14. The tiltrotor aircraft of claim 11, wherein the flight control computer is further adapted to determine that the tiltrotor aircraft has transitioned out of a hover mode, and to convert the signal representing a longitudinal motion of the second inceptor into a flight path change rate command for the tiltrotor aircraft.

15. The tiltrotor aircraft of claim 11, wherein the flight control computer is further adapted to determine that an airspeed of the tiltrotor aircraft is below a threshold speed and to control a position of the tiltrotor aircraft using a Translational Rate Control (TRC) mode.

* * * * *